United States Patent [19]

Teraoka et al.

[11] Patent Number: 4,619,417

[45] Date of Patent: Oct. 28, 1986

[54] ACCELERATION SENSOR

[75] Inventors: Fuminori Teraoka; Takeo Matsui; Shinji Mori, all of Aichi, Japan

[73] Assignee: Kabushiki Kaisha Tokai-Rika-Denki-Seisakusho, Aichi, Japan

[21] Appl. No.: 591,510

[22] Filed: Mar. 20, 1984

[30] Foreign Application Priority Data

Mar. 22, 1983 [JP] Japan .............................. 58-040891[U]

[51] Int. Cl.⁴ ............................................. B60R 22/40
[52] U.S. Cl. ............................................. 242/107.4 A
[58] Field of Search .......................... 73/514; 116/203; 200/61.45 R; 242/107.4 A; 280/806; 297/478

[56] References Cited

U.S. PATENT DOCUMENTS 4,057,200 11/1977 Ubukata et al. ............. 242/107.4 A
4,453,681 6/1984 Gueguen et al. ............. 242/107.4 A
4,483,495 11/1984 Hönl ............................. 242/107.4 A Primary Examiner—Stewart J. Levy
Assistant Examiner—John E. Chapman, Jr.

[57] ABSTRACT

In an acceleration sensor for use in an automobile seatbelt system comprising a rolling body which moves when subjected to an acceleration, a cup-like receptacle member for supporting the rolling body on a sloping surface rising towards an outer periphery of the receptacle member, and a pivotally mounted actuator over the rolling body for triggering a web halting mechanism, wherein the sloping surface is formed with a plurality of radially disposed ribs, so that the rolling body is prevented from rolling around the sloping surface even when subjected to vibration from rough roads. The invention prevents the web belting mechanism from being triggered spuriously without diminishing the sensitivity of the acceleration sensor in a bona fide vehicular emergency situation.

7 Claims, 4 Drawing Figures

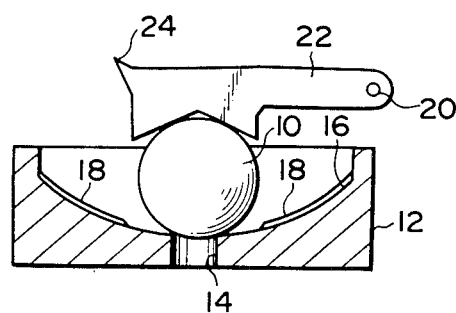
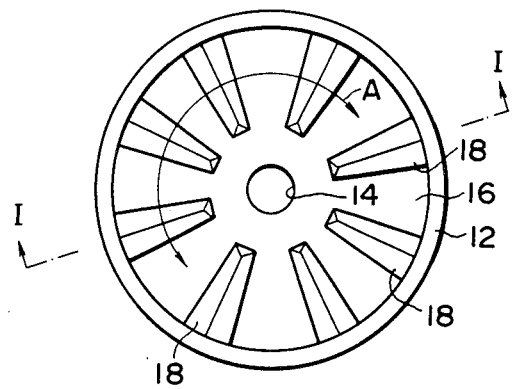

ACCELERATION SENSOR

BACKGROUND OF THE INVENTION

1. Field of the Invention

The present invention relates to an acceleration sensor adapted for use in a seatbelt system for protecting an occupant of a vehicle in an emergency situation of the vehicle.

2. Description of the Prior Art

In vehicles such as automobiles acceleration sensors are sometimes used to prevent seatbelts from being unwound from a webbing retractor during emergency situations.

In such seatbelt systems, the webbing fastened about the occupant is retracted in layers and stored within a webbing retractor fixed to the vehicle body. The acceleration sensor present within the webbing retractor allows the webbing to be unwound in an ordinary running situation of the vehicle, so that the occupant can change his attitude voluntarily. However, in an emergency situation of the vehicle, this acceleration sensor prevents the webbing from being unwound from the webbing retractor, so that the occupant is safely restrained by the webbing.

In the ordinary running situation of the vehicle, the ball remains in a stop position in the acceleration sensor. However, when an acceleration of more than a predetermined value acts on the acceleration sensor, the ball ascends a slope formed within the acceleration sensor and triggers an actuator disposed on the ball, thereby stopping the webbing from unwinding out of the webbing retractor.

Unfortunately, such prior art acceleration sensors are not without shortcomings. For example, when the vehicle runs on a rough road, the ball may be slightly moved from its stop position due to vibration, so that in some cases the web-breaking actuator is pushed up, or actuated, by the ball. This actuator may in turn engage a ratchet wheel in the webbing retractor, thereby preventing the unwinding of the webbing, which in turn results in discomforture to the occupant restrained by the webbing.

SUMMARY OF THE INVENTION

The present invention has as its object the provision of an acceleration sensor in which the ball is prevented from its stop position when subjected to vibration from a rough road, so that the actuator disposed on the ball will not be spuriously actuated by the ball.

Description is given hereunder of the embodiment according to the present invention with reference to the accompanying drawings.

BRIEF DESCRIPTION OF THE DRAWINGS

FIG. 1 is a side view of a first embodiment of the present invention including a sectional view taken along line I—I;

FIG. 2 is a plan view of FIG. 1 from which the actuator and ball are removed;

PREFERRED EMBODIMENT OF THE INVENTION

Figure 3:
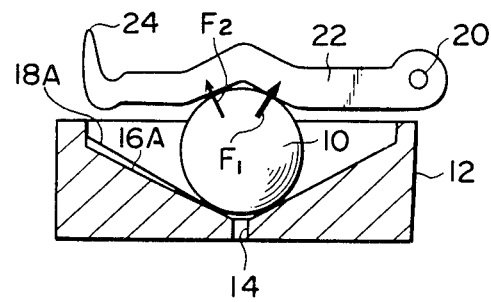
FIG. 3 is a side view of a second embodiment of the present invention including a sectional view taken along line III—III.

FIGS. 1 and 2 show an acceleration sensor adapted for use in a seatbelt system according to a first embodiment of the present invention.

In this acceleration sensor a rolling body such as ball 10 is received in a receptacle member such as ball case 12. The ball case 12 is formed at its central portion with a cylindrical hole 14 having its axial center oriented vertically. The place where the ball 10 is positioned on the cylindrical hole 14 or on the central portion of the ball case 12 is defined as a stop position of the ball 10. Formed on the ball case 12 is a slope 16 which gradually rises from the upper edge of the cylindrical hole 14 towards the periphery of the ball case 12, and, when the ball 10 is subjected to acceleration, the ball 10 rolls up the slope 16.

Formed on the slope 16 and extending radially from the axial center of the cylindrical hole 14 are a plurality of converging ribs 18 which together form guide means, as shown in FIG. 2. The surface of the curved slope 16 varies in relief as a result of the ribs 18 which define shallow grooves in the slope 16 for guiding the ball 10 upwardly on the slope 16 in an emergency situation of the vehicle.

The proximal end of each of the ribs 18 falls short of the edge of the cylindrical hole 14 so that the ball will not roll into the ends of the ribs 18 at the beginning of its motion in response to an emergency situation of the vehicle.

Disposed on the upper portion of the ball 10 is an actuator 22 pivotally mounted at one end portion by a pin 20. The actuator 22 is formed at its other end portion with a pawl 24 latched to a ratchet wheel (not shown) which rotates along with a takeup shaft disposed in the webbing retractor of the seatbelt system, so that when the ball 10 rolls up the slope 16, the actuator 22 is pivoted to cause the pawl 24 to be latched to the ratchet wheel, thereby halting the rotation of the takeup shaft.

Description will now be given of the operation of this embodiment according to the present invention.

When the ball 10 is positioned at the stop position over the cylindrical hole 14 in an ordinary running situation of the host vehicle, the actuator 22 is maintained in the condition shown in FIG. 1, which allows the takeup shaft in the webbing retractor to unwind so that an occupant secured by the webbing can easily change his attitude.

In a conventional acceleration sensor, when the vehicle runs on a rough road, it is possible for the ball 10 to roll up on the slope 16 due to vibrations and to roll around the stop position, or around the cylindrical hole 14, in the direction of the arrow A shown in FIG. 2. If this happens, the actuator 22 is pushed up, and chattering noises are generated between the pawl 24 and the ratchet wheel. Worse yet, the pawl 24 may be caused to engage with the ratchet wheel, thereby preventing any unwinding of the webbing. This, of course, causes discomforture to the occupant secured by the webbing in the vehicle.

By contrast, in the acceleration sensor of the embodiment, when the vehicle runs on the rough road in the same manner as the above, the ball 10 may roll up the slope 16 a little way due to vibrations, but will be prevented from running around the slope 16 in the direction of arrow A by the ribs 18 which will serve to guide the ball 10 towards the cylindrical hole 14 back to the stop position.

Accordingly, in the acceleration sensor of the embodiment, even when the vehicle runs on such a rough road, the webbing can be unwound from the webbing retractor since the actuator 22 will not be pushed up. Thus the comfort of the occupant secured by the webbing in the vehicle can be maintained.

However, in an emergency situation of the vehicle such as a collision, the ball 10 rolls upwardly on the slope 16 so that the actuator 22 is tilted to cause the pawl 24 to engage with the ratchet wheel (not shown). This in turn prevents an unwinding rotation of the takeup shaft in the webbing retractor so that the occupant is securely restrained by the webbing.

Figure 4:
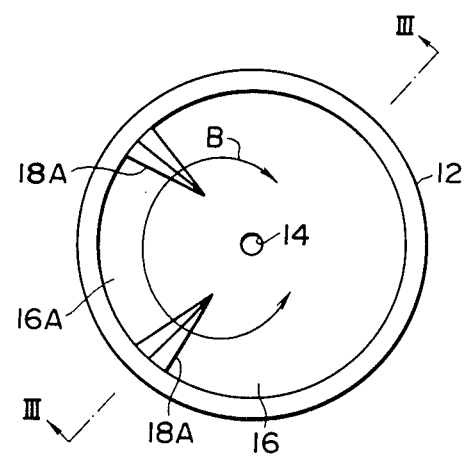
FIG. 4 is a plan view of FIG. 3 from which the actuator and a ball are removed.

FIGS. 3 and 4 show an acceleration sensor according to a second embodiment of the present invention.

In this embodiment two ribs 18A are formed on a slope 16 in a radial direction from a cylindrical hole 14 in the same manner as the first embodiment. The respective ribs 18A are of wedge shape, as is evident from FIG. 4. The forward or proximal ends of each rib 18A are either separated from the ball 10 at its stop position, or slightly in contact therewith since the forward ends of the ribs 18A are formed much more sharply than those of the ribs 18 of the first embodiment. Hence the ends of the ribs 18A do not affect the performance, or sensitivity, of the acceleration sensor.

When the vehicle runs on a rough road, the ribs 18A (like the ribs 18 of the first embodiment) prevent the ball 10 from rolling around the stop position, so that the actuator 22 supported by the ball 10 through a pin 20 is restrained from being unnecessarily actuated, or pivoted about the pin 20. Particularly, in this second embodiment the ribs 18A are positioned at opposite sides to the position of the pin 20 regarding the ball 10 put at the stop position, whereby unnecessary movement of the ball 10 can better be prevented. The reason is as follows:

As noted from FIGS. 1 and 3, the pawl 22 is formed in a conical shape where it contacts the ball 10. In FIG. 3, the force $F_1$ required for the ball 10 to push up the end of the actuator 22 adjacent to the pin 20, i.e., for rolling up the slope 16 in the right direction in FIG. 3, is larger than the force $F_2$ required for the ball 10 to push up the end of the actuator 22 opposite fro the pin 20, i.e., for rolling up the slope 16 in the left direction in FIG. 3. The difference between these forces $F_1$ and $F_2$ is a result of the different leverage that the ball 10 applies against the actuator 22 on the right and left sides. Therefore, when the vehicle runs on a rough road and the acceleration sensor is subjected to vibration, the ball 10 rolls up the side of the slope 16 opposite from the pin 20, i.e., in the left direction, more readily than the side adjacent to the pin 20, i.e., in the right direction. The end result is that the ball 10 will tend to roll eccentrically around the cylindrical hole 14 mainly on the portion 16A of the slope 16 opposite from the pin 20 in directions of arrow B shown in FIG. 4. But, because of the presence of the ribs 18A, when the vehicle runs on a rough road, the ball 10 is effectively prevented from rolling up the slope 16 around the cylindrical hole 14 in the direction of the arrow B.

However, when the ball 10 is subjected to a sudden large acceleration due to an emergency situation of the vehicle, the ball 10 will roll upwardly on the slope 18A with little or no resistance from the ribs 18A even though it may contact the ribs 18A, since the top portions of the ribs 18A are tapered. Thus, the ribs 18A do not impair the sensitivity of the acceleration sensor of the present invention.

In this second embodiment, the ribs 18A are formed in a wedge shape but it should be noted that they may also be formed in a thin plate shape. Also, the number of the ribs is not limited to those shown in the first and second embodiments but may be changed in accordance with the specific application. In addition, the ribs may be formed on the slope by forming grooves extending radially from the axial center of the cylindrical hole.

What is claimed is:

1. An acceleration sensor adapted for use in a seatbelt system which protects an occupant in a vehicle, comprising:
   (a) a rolling body which moves when an acceleration acts thereupon;
   (b) a receptacle member for supporting the rolling body thereon, the receptacle member being formed with a slope which rises gradually from a bottom center portion which defines a stop position for the rolling body and which ends at a top periphery of the receptacle member, wherein said slope is formed with a plurality of ribs which extend towards said top periphery of the member, said top portions of the respective ribs being tapered, whereby the rolling body is prevented from rolling around the stop position of the slope; and
   (c) an actuator disposed on the rolling body, one end portion thereof being pivotally mounted through a support means, and a portion of the actuator having a conical recess for contacting the rolling body and being pivotally movable upwardly when subjected to a force from the rolling body,
   wherein the ribs are formed on a portion of the slope located substantially between the stop position, and the top periphery of the receptacle member opposite the support means.

2. An acceleration sensor as set forth in claim 1, wherein the ribs are separated from the rolling body when said body is at the stop position.

3. An acceleration sensor as set forth in claim 1, wherein the ribs are wedge-shaped.

4. An acceleration sensor as set forth in claim 3, including two ribs.

5. An acceleration sensor adapted for use in a seatbelt system for protecting an occupant of a vehicle, which comprises:
   (a) a rolling body which moves when acceleration acts thereupon;
   (b) a receptacle member for supporting the rolling body thereon, the receptacle member being formed with a slope which rises gradually from a bottom center portion which defines a stop position for the rolling body and which ends at a top periphery of the receptacle member, wherein said slope is formed with a plurality of ribs which extend radially towards an upper periphery of the slope, the top portions of the ribs being tapered, whereby the rolling body is prevented from rolling around the stop position, and
   (c) an actuator disposed on the rolling body, one end portion thereof being pivotally mounted on a support means and the other end portion being formed with a pawl latched to a ratchet wheel of the seatbelt system, and the actuator having a conical recess at its contact portion with the rolling body and being pivotally movable upwardly when subjected to a force from the rolling body, wherein the ribs are formed on a portion of the slope located substantially between the stop position, and the top periphery of the receptacle member opposite the support means.

6. An acceleration sensor adapted for use in a seatbelt system for protecting an occupant in a vehicle, comprising:
- (a) a rolling body which moves when an acceleration acts thereupon;
- (b) a receptacle member for supporting the rolling body thereon, the receptacle member being formed with a slope which rises from a bottom center portion which defines a stop position for the rolling body, and which ends at a top periphery of the receptacle member, said slope having a plurality of ribs for preventing the rolling body from rolling around its stop position in response to vibration, wherein none of said ribs come into contact with said rolling body when said body is at its stop position so that said body is equally free to roll out of its stop position in any radial direction in response to an acceleration indicative of an emergency vehicular situation, and
- (c) an actuator disposed on the rolling body, one end portion thereof being pivotally mounted through a support means, and a portion of the actuator having a conical recess for contacting the rolling body and being pivotally movable upwardly when said rolling body rolls up said slope a certain radial distance.

7. An acceleration sensor as described in claim 6, wherein said ribs are wedge-shaped and radially disposed relative to the stop position defined in the slope, and wherein the angular end of each of the ribs is nearest to the stop position.

* * * * *